US007826094B2

(12) United States Patent
Yokochi

(10) Patent No.: US 7,826,094 B2
(45) Date of Patent: Nov. 2, 2010

(54) APPARATUS FOR PROCESSING DATA DESCRIBING AN IMAGE AND IMAGE FORMING DEVICE

(75) Inventor: Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1252 days.

(21) Appl. No.: 11/277,742

(22) Filed: Mar. 28, 2006

(65) Prior Publication Data
US 2006/0221398 A1 Oct. 5, 2006

(30) Foreign Application Priority Data
Mar. 30, 2005 (JP) ............... 2005-099252

(51) Int. Cl.
H04N 1/40 (2006.01)
(52) U.S. Cl. ............... 358/3.01; 358/518; 358/2.1; 358/3.21; 358/3.26; 358/3.27; 358/1.9
(58) Field of Classification Search ............... 358/1.1, 358/1.2, 1.8, 1.9, 3.01, 3.03, 3.05, 3.26, 518
See application file for complete search history.

(56) References Cited

U.S. PATENT DOCUMENTS

| 5,708,514 | A  | * | 1/1998 | Higuchi et al. | ............. 358/3.03 |
| 7,057,776 | B2 | * | 6/2006 | Akiyama | ............. 358/462 |
| 7,064,866 | B1 | * | 6/2006 | Asada | ............. 358/2.1 |
| 2001/0019432 | A1 | * | 9/2001 | Akiyama | ............. 358/518 |
| 2002/0039444 | A1 | * | 4/2002 | Yamagata et al. | ............. 382/199 |
| 2003/0184677 | A1 | * | 10/2003 | Kuzumoto et al. | ............. 348/465 |
| 2004/0189788 | A1 | * | 9/2004 | Tanaka | ............. 347/236 |
| 2005/0280852 | A1 | * | 12/2005 | Namizuka | ............. 358/3.01 |
| 2006/0132847 | A1 | * | 6/2006 | Xu et al. | ............. 358/3.03 |
| 2009/0226085 | A1 | * | 9/2009 | Shiraishi | ............. 382/167 |

FOREIGN PATENT DOCUMENTS

| JP | H1156070 | 6/1989 |
| JP | H11-275358 A | 10/1999 |
| JP | 2000184194 A | 6/2000 |
| JP | 2000333007 A | 11/2000 |
| JP | 2000350029 | 12/2000 |
| JP | 2001358944 A | 12/2001 |
| JP | 2003175639 | 6/2003 |
| JP | 2003274176 | 9/2003 |

OTHER PUBLICATIONS

Japanese Patent Office, Office Action (in Japanese Patent Appl'n No. 2005099252 (counterpart to above-captioned U.S. patent appl'n) mailed Jul. 3, 2007.

* cited by examiner

Primary Examiner—Kimberly A Williams
(74) Attorney, Agent, or Firm—Baker Botts L.L.P.

(57) ABSTRACT

An apparatus for processing data describing an image is provided with an input device, a binarizing device, a correcting device, a driving pulse generating device, and an adjusting device. The input device inputs the data. The binarizing device performs a binarizing calculation on the input data. The correcting device corrects the binarizing calculation when a pixel that needs adjustment of a driving pulse thereof has been identified based on the binarized data. The driving pulse generating device generates driving pulses based on the binarized data. The adjusting device adjusts the driving pulse when the pixel that needs adjustment of the driving pulse thereof has been identified based on the binarized data.

10 Claims, 15 Drawing Sheets (A) 25% Tone (B)

(C)

(D) 25% Tone

⬇ 50% Dilation Parameter (E)

| Input Pixel Value | 25 | 25 | 25 | 25 | 25 | 25 | 25 | 25 |
|---|---|---|---|---|---|---|---|---|
| Accumulated Pixel Value | 25 | 50 | −25 | 0 | 25 | 50 | −25 | 0 |
| 2-Valued Value(Binarized Data) | 0 | 1 | 0 | 0 | 0 | 1 | 0 | 0 |
| Accumulated Error Value | 25 | −50 | −25 | 0 | 25 | −50 | −25 | 25 |

FIG. 15

| Input Pixel Value | 25 | 25 | 25 | 25 | 25 | 25 | 25 | 25 | 25 |
|---|---|---|---|---|---|---|---|---|---|
| Accumulated Pixel Value | 25 | 50 | -25 | -50 | -25 | 0 | 25 | 50 | 25 |
| 2-Valued Value (Binarized Data) | 0 | 1 | 0 | 0 | 0 | 0 | 0 | 1 | 0 |
| Subtracting Parameter | 0 | 0 | 50 | 0 | 0 | 0 | 0 | 0 | 50 |
| Accumulated Error Value | 25 | -50 | -75 | -50 | -25 | 0 | 25 | -50 | -75 |

APPARATUS FOR PROCESSING DATA DESCRIBING AN IMAGE AND IMAGE FORMING DEVICE

CROSS REFERENCE TO RELATED APPLICATION

This application claims priority to Japanese Patent Application No. 2005-099252, filed on Mar. 30, 2005, the contents of which are hereby incorporated by reference into the present application.

BACKGROUND OF THE INVENTION

1. Field of the Invention

The present invention relates to an apparatus for processing data that describes an image, and also relates to an image forming device.

2. Description of the Related Art

Image forming devices such as copiers, laser printers, etc. are known to the art. The image forming devices are provided with an image processing apparatus that binarizes image data that has been input, selectively forms printing dots on a recording medium based on the binarized data, and forms an image on the recording medium.

Japanese Laid-open Patent Publication No. H1-156070 teaches a technique wherein data is binarized by the Error Diffusion Method, and a printer engine is driven based on the binarized data. With the Error Diffusion Method, pixel values that describe the tone of processing pixels are accumulated sequentially, and the accumulated value is compared with a threshold value. If the accumulated value does not reach the threshold value, '0' is assigned to the processing pixel. If the accumulated value reaches the threshold value, '1' is assigned to the processing pixel, and a tone value that corresponds to the formation of a printing dot is subtracted from the accumulated value. With the Error Diffusion Method, the error between the binarized values and the pixel values that describe the image data accumulates, and the accumulated error value is reflected in a different pixel being binarized.

BRIEF SUMMARY OF THE INVENTION

With binarized data, wherein image data has been binarized, an isolated pixel may be formed in which the binarized value differs from surrounding pixels. When an isolated pixel has been formed in the binarized data, the image forming device might be unable to stably form a minute printing dot that corresponds to the isolated pixel. For example, with a monochrome laser printer, there is the problem that toner that should form minute printing dots is not transferred stably to the recording paper, and that low tone gradation expressions cannot be formed adequately. This type of problem can readily occur when the size of printing dots that the laser printer can form stably (referred to below as minimum dot size) is greater than the resolution of the binarized data.

In order to prevent this problem, a reduction in the resolution of the image data was considered. However, if the resolution of the image data is reduced, there is an increase in the graininess of the image that is formed. Alternatively, use of the dither method was considered. However, the way in which the dither matrix is scaled causes letters to be broken.

It was considered making the pulse width of the laser relatively wide and thus dilating the printing dot when forming the minute printing do: that prints the isolated pixel. However, the entire image becomes darker if this dilating process is performed. Conversely, contracting the surrounding printing dots when forming minute non-printing dot was considered. However, the entire image becomes lighter if this contracting process is performed.

When binarizing image data and forming an image, there is still room for improving the gradation expressions formed by the image forming device, because there are not only this issue of isolated pixel but also various issues that should be taken into consideration.

The present invention teaches a technique enabling the image forming device to form satisfactory gradation expressions by binarizing the image data appropriately.

An apparatus of the present teachings processes data describing an image. The apparatus is provided with an input device, a binarizing device, a correcting device, a driving pulse generating device, and an adjusting device. The input device inputs the data. The binarizing device performs a binarizing calculation on the input data. The correcting device corrects the binarizing calculation when a pixel needing adjustment of a driving pulse thereof has been identified based on the binarized data. The driving pulse generating device generates driving pulses based on the binarized data. The adjusting device adjusts the driving pulse when the pixel needing adjustment of the driving pulse thereof has been identified based on the binarized data.

With this image processing apparatus, when the pixel needing adjustment of the driving pulse thereof has been identified based on the binarized data, the binarizing calculation is corrected. This adjustment of the driving pulse prevents the entire image from becoming darker or lighter.

BRIEF DESCRIPTION OF THE DRAWINGS

FIG. 14 is a table showing changes in the data during the binarizing process when the correcting process is not performed.

FIG. 15 is a table showing changes in the data during the binarizing process when the correcting process is performed.

DETAILED DESCRIPTION OF THE INVENTION

An embodiment of the present invention will be described with reference to figures. Below, an embodiment will be described wherein the present invention has been applied to a multifunctional product. The multifunctional product of the embodiment described below has a printer engine and an image sensor. The multifunctional product can be provided with a fax function whereby image data received via a telephone line can be printed on recording paper that constitutes a recording medium, and whereby image data read from an original document can be transmitted via a telephone line. Further, the multifunctional product can be provided with a copier function whereby image data read from an original document can be printed on recording paper. Furthermore, the multifunctional product can be provided with a printer function whereby image data transmitted from an external computer can be printed on recording paper. Moreover, the multifunctional product can be provided with a scanner function whereby image data read from an original document can be transmitted to an external computer.

Figure 1:
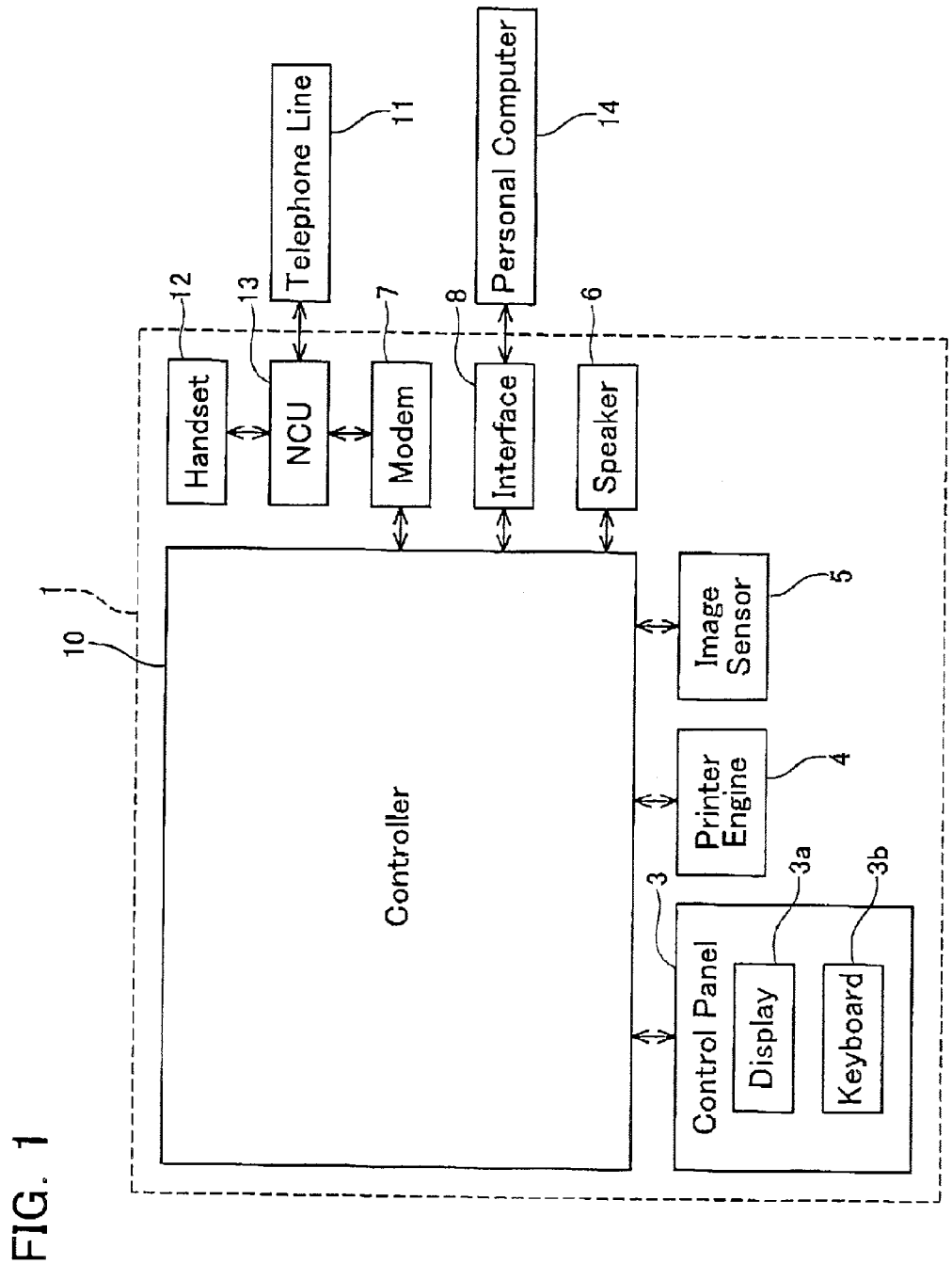
FIG. 1 is a block diagram schematically showing the configuration of a multifunctional product of an embodiment of the present invention.

FIG. 1 is a block diagram schematically showing the configuration of the multifunctional product 1. As shown in FIG. 1, the multifunctional product 1 comprises a controller 10 having a CPU, ROM, and RAM, a control panel 3 connected with the controller 10, a printer engine 4, an image sensor 5, a speaker 6, a modem 7, an interface 9, etc. The control panel 3 is provided with a display 3a and a keyboard 3b, and allows a user to input settings and commands. The modem 7 is connected with an NCU 13 connected with a telephone line 11 and a handset 12. The modem 7 transmits image data to and receives image data from an external fax device, and transmits sound data to and receives sound data from an external telephone set. Moreover, the interface 8 is provided with a Centronix communication interface or an advanced communication interface, and allows data to be transmitted to and received from an external personal computer 14.

Figure 2:
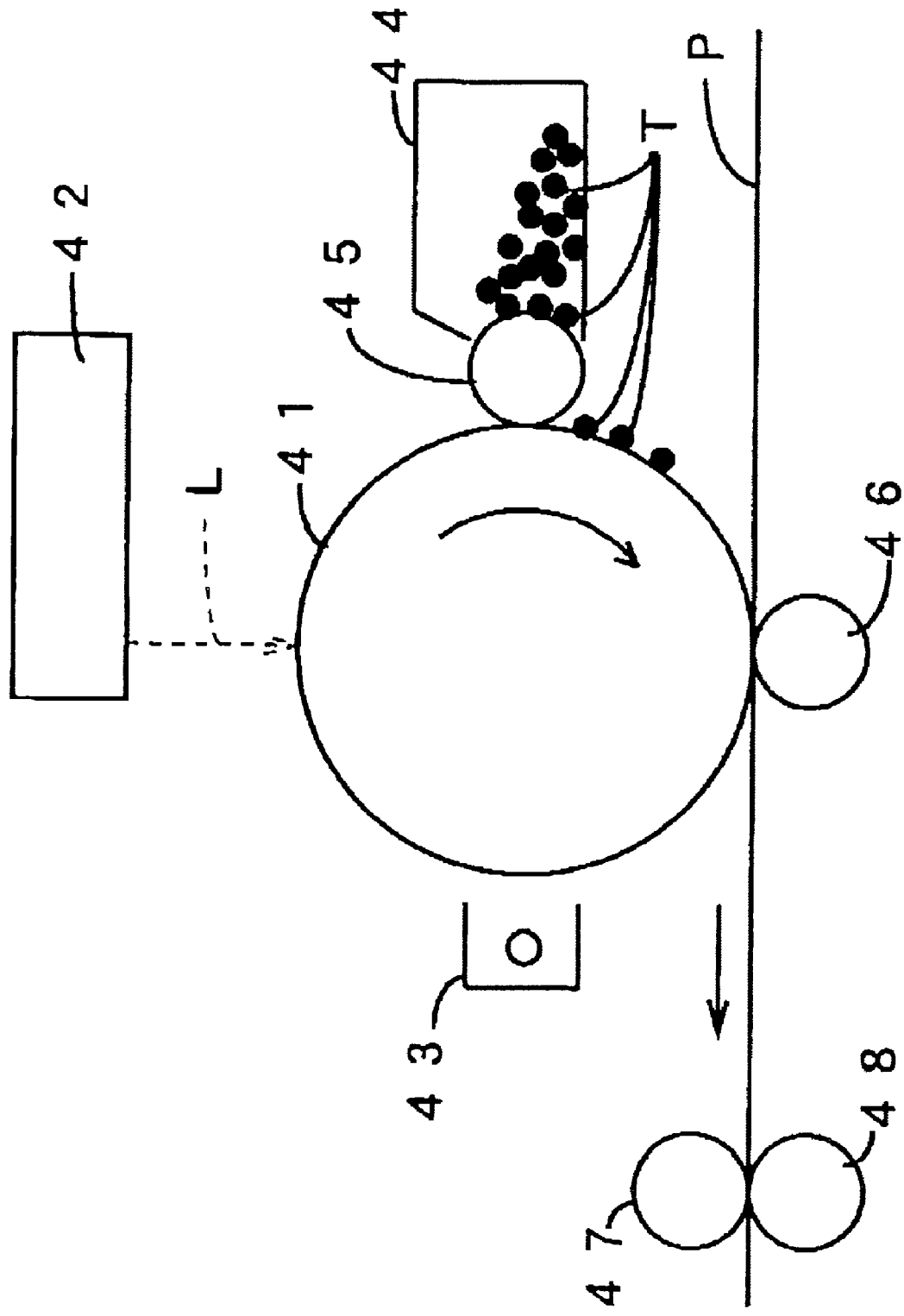
FIG. 2 is a figure schematically showing the configuration of a printer engine of the multifunctional product.

The printer engine 4 forms images on the recording paper by the electrophotographic method. As shown in FIG. 2, the printer engine 4 is provided with a photosensitive drum 41 and a scanner unit 42. The photosensitive drum 41 is a photosensitive member that forms an electrostatic latent image on a surface by means of exposure from a laser beam L. The scanner unit 42 is an exposure apparatus that exposes the surface of the photosensitive drum 41 to the laser beam L. The scanner unit 42 is provided with a laser diode and a polygonal mirror (not shown), and has a known configuration for exposing the photosensitive drum 41 while scanning in the direction of a rotating shaft thereof.

The photosensitive drum 41 rotates in the direction shown by the arrow in FIG. 2. A scorotron charger 43, a toner cartridge 44, a developer roller 45, and a transfer roller 46 are formed in the area surrounding the photosensitive drum 41. The scorotron charger 43 causes the surface of the photosensitive drum 41 to be equally charged. The scanner unit 42 expose portion's of the photosensitive drum 41 to laser. The exposure area is controlled based on data describing the image. The toner cartridge 44 houses toner T that constitutes a developer. The developer roller 45 causes the toner T to adhere to the surface of the photosensitive drum 41, and develops the electrostatic latent image. The transfer roller 46 grips recording paper P between itself and the photosensitive drum 41 and conveys the recording paper P in the direction shown by the arrow. At this juncture, the toner T adhering to the surface of the photosensitive drum 41 is transferred to the recording paper P. Further, the printer engine 4 is provided with a heating roller 47 and a pressure roller 48. The recording paper P onto which the toner T has been transferred is conveyed between the heating roller 47 and the pressure roller 48, and the toner T that has been transferred is thus fixed. The image is thus formed on the recording paper P.

Although this is not shown in FIG. 2, the printer engine 4 is a tandem type laser printer, and the four photosensitive drums 41 are provided for toners of the following four colors: C (cyan), M (magenta), Y (yellow), and K (black). With this printer engine 4, the toner image of these four colors is transferred to the recording paper P, and is then fixed by the heating roller 47 and the pressure roller 48.

Figure 3:
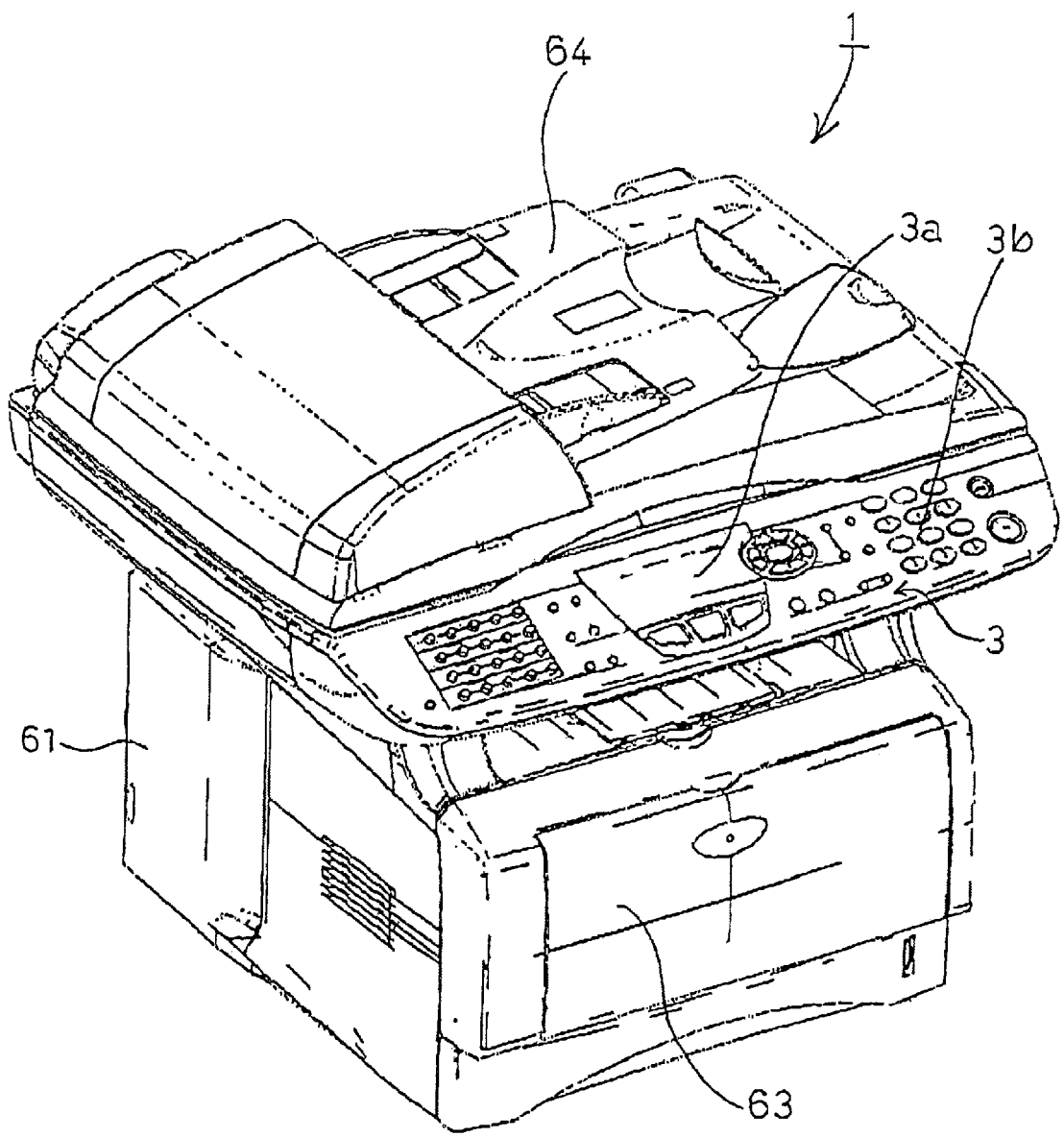
FIG. 3 is a perspective view showing an exterior view of the multifunctional product.

FIG. 3 shows an exterior view of the multifunctional product 1. As shown in FIG. 3, a multi-purpose tray (MP tray) 63 is formed at an anterior face of a main body 61 of the multifunctional product 1. The MP tray 63 is provided with a plurality of trays (not shown) for holding the recording paper P. The trays of the MP tray 63 can house up to a maximum of one hundred sheets of the recording paper P of any size. The recording paper P housed in the MP tray 63 is supplied to the printer engine 4.

The control panel 3 and an original document mount 64, in which an original document is positioned when a fax transmitting process or a copy process are to be performed, are formed at an upper plate of the multifunctional product 1.

When the original document is positioned in the original document mount 64 and the copy process is commanded by means of the control panel 3, the multifunctional product 1 reads the original document using the image sensor 5 (see FIG. 1), and executes the copy process by using the printer engine 4 to form the image that has been read onto the recording paper P that was being held in the tray.

Figure 4:
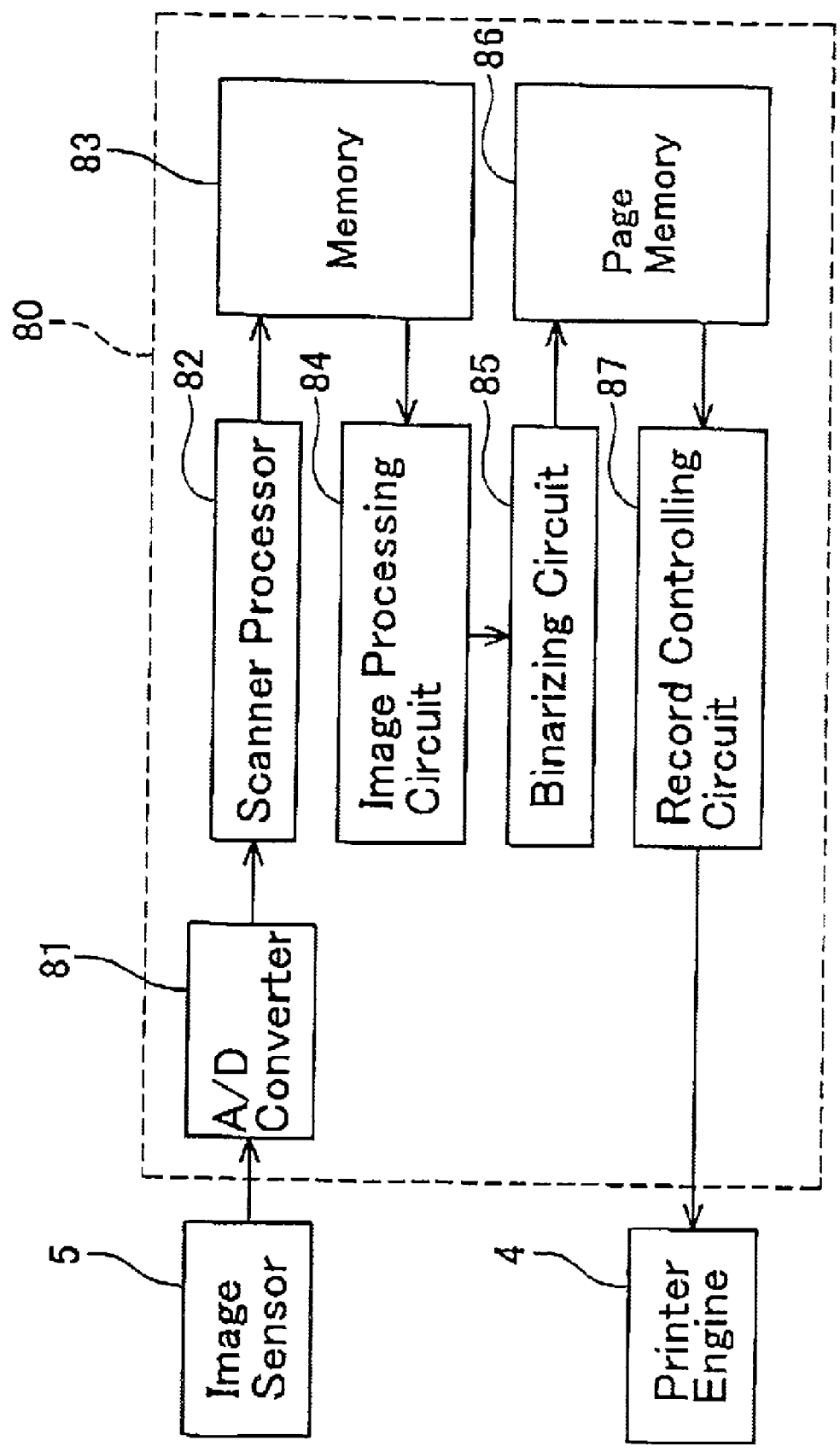
FIG. 4 is a block view schematically showing the configuration of a copy process circuit of the multifunctional product.

The configuration and process of a copy process circuit go relating to the copy process performed by the controller 10 will now be described. FIG. 4 is a block diagram schematically showing the configuration of the copy process circuit 80. As shown in FIG. 4, the copy process circuit 90 is provided with an A/D converter 81, a scanner processor 82, and a memory 83. The A/D converter 81 converts the analog image data input from the image sensor 5 into digital data. The scanner processor 82 performs a compensation process on the image data that was converted into digital data by the A/D converter 81. The memory 83 temporarily stores the image data that was processed by the scanner processor 82.

Furthermore, the copy process circuit 80 is provided with an image processing circuit 84, a binarizing circuit 85, a page memory 86, and a record controlling circuit 87. The image processing circuit 84 performs image processing on the image data stored in the memory 83. The binarizing circuit 85 performs a binarizing process on the image data (multi-value image data describing the tone of the pixels) that was processed by the image processing circuit 84, and creates binarized data that describes whether each pixel form or do not form a printing dot. The page memory 86 stores the binarized data that has been created. The record controlling circuit 87 outputs driving pulses for controlling the printer engine 4 based on the binarized data stored in the page memory 86.

Figure 5:
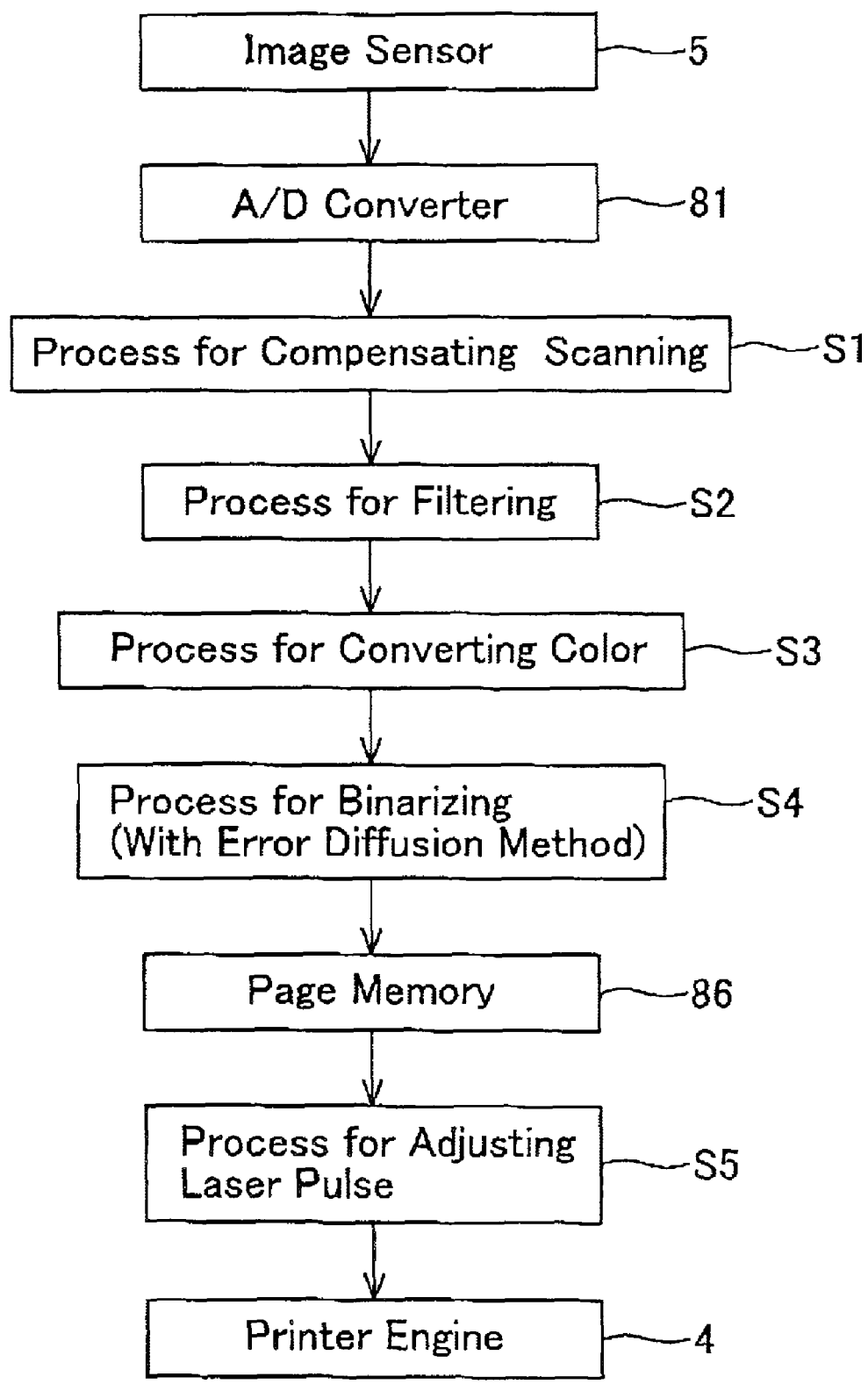
FIG. 5 is a flowchart showing the sequence of a process executed by the copy process circuit.

FIG. 5 is a flowchart showing the sequence of the process executed by the copy process circuit 80. As shown in FIG. 5, the image data input from the image sensor 5 is converted into digital data by the A/D converter 81, and the scanner processor 82 performs a scanning compensation process (step S1).

In the scanning compensation process, known compensation processes are performed such as shading, black compensation, gamma compensation, etc. The image data after compensation is stored in the memory 83.

A filtering process (step S2) and a color converting process (step S3) are performed by the image processing circuit 84 on the image data stored in the memory 83. Known processes such as MTF compensation, an enhancement process, a smoothing process, etc. are performed in the filtering process. R (red), G (green), and B (blue) data obtained by the image sensor 5 is converted by the color converting process into C (cyan), M (magenta), Y (yellow), and K (black) data for driving the printer engine 4.

The image data that was converted by the color converting process is multi-value data and includes a sequence of values describing the tone of each of the pixels. The values describing the tone of the pixels will be termed pixel values. After the color converting process has been performed on the image data, the binarizing circuit 85 performs the binarizing process thereon (step S4). The Error Diffusion Method is utilized in the binarizing process. The multi-value data describing the pixel value of each of the pixels is converted in the binarizing process into binarized data that describes pixels for forming the printing dots at appropriate intervals.

After the binarized data has been stored in the page memory 86, the binarized data is read by the record controlling circuit 87 while the printer engine 4 operates. The record controlling circuit 87 creates driving pulses for the laser diode of the scanner unit 42 based on the binarized data, and outputs the driving pulses that have been created to the printer engine 4. At this juncture, the record controlling circuit 87 performs a process for adjusting a driving pulse width (to be described) in order to form the dots stably (step S5).

The binarizing circuit 85 and the record controlling circuit 87 will now be described in detail. For the sake of convenience, only the process for black will be described first in the description below, and then the application of the process for colors will be described.

Figure 6:
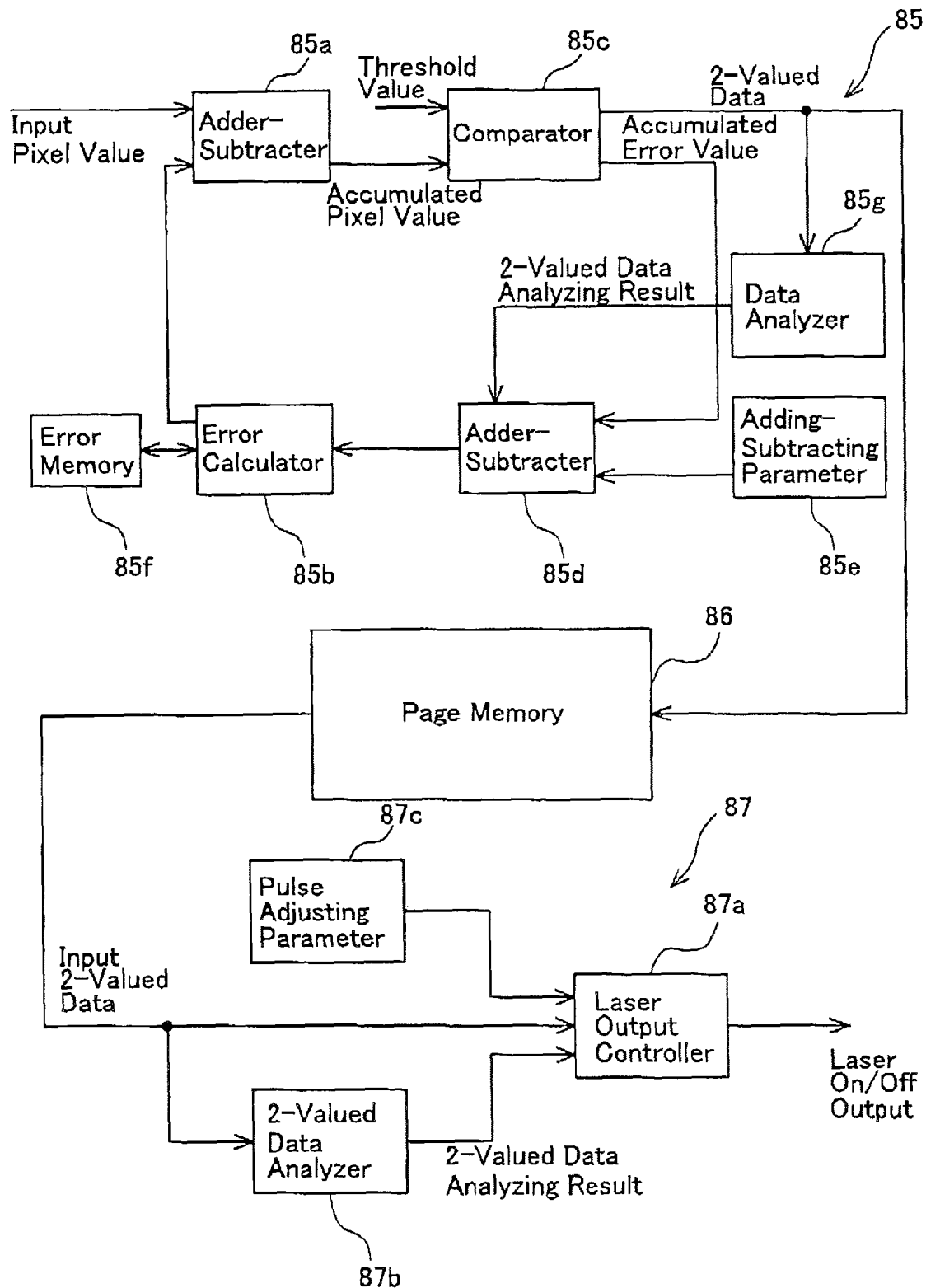
FIG. 6 is a block diagram showing in detail the configuration relating to black for a binarizing circuit and a record controlling circuit of the copy process circuit.

FIG. 6 is a block diagram showing in detail the configuration of the binarizing circuit 85 and the record controlling circuit 87. As shown in FIG. 6, the binarizing circuit 85 is provided with a first adder-subtracter 85a, an error calculator 85b, a comparator 85c, a second adder-subtracter 85d, an adding-subtracting parameter 85e, an error memory 85f, and a first binarized data analyzer 85g. Furthermore, the record controlling circuit 87 is provided with a laser output controller 87a, a second binarized data analyzer 87b, and a pulse adjusting parameter 87c.

The pixel values of pixels arranged in a scanning direction are input sequentially to the binarizing circuit 85 from the image processing circuit 84 (see FIG. 4). The pixel values input from the image processing circuit 84 are input to the first adder-subtracter 85a. The first adder-subtracter 85a adds the input pixel value and an accumulated error value (to be described) input from the error calculator 85b at every time when the new pixel value is input. This added value is termed an accumulated pixel value. The accumulated pixel value is input to the comparator 85c.

The comparator 85c compares the input accumulated pixel value with a threshold value, and outputs '1' if the accumulated pixel value reaches the threshold value, and outputs '0' if the accumulated pixel value does not reach the threshold value. Here, '1' is equivalent to a printing-flag, and '0' is equivalent to a non-printing flag. In the case where the binarized value is determined to be '1', the comparator 85c subtracts a tone '100' equivalent to the printing dot (this may be a value of tone equivalent to the printing dot or may be another value) from the input accumulated pixel value, and outputs the result as the accumulated error value. In the case where the binarized value is determined to be '0', the comparator 85c outputs the input accumulated pixel value unchanged as the accumulated error value. In the case where the pixel value describing the tone of each pixel comprises eight bits, the actual tone equivalent to the printing dot is '255' ($2^8-1$). However, for the sake of convenience, this is described as '100' (%).

The accumulated error value output from the comparator 85c is input to the second adder-subtracter 85d. The parameter stored in the adding-subtracting parameter 85e (to be described) is added to or subtracted from, as required, the accumulated error value input to the second adder-subtracter 85d, and then the accumulated error value is input to the error calculator 85b. The error calculator 85b stores the accumulated error value input from the second adder-subtracter 85d in the error memory 85f, and inputs this error data to the first adder-subtracter 85a. The accumulated error value of at least one scanning line segment is stored in the error memory 85f, and can be utilized to control the next scanning line.

Further, the binarized data output from the comparator 85c is stored in the page memory 86, and is then input to the laser output controller 87a of the record controlling circuit 87. The laser output controller 87a forms and outputs driving pulses for the laser diode based on the input binarized data. At this juncture, the second binarized data analyzer 87b analyzes the input binarized data, and detects pixels in which the pulse width of the driving pulse needs adjustment. When the second binarized data analyzer 87b has detected a pixel in which the pulse width of the driving pulse needs adjustment, the laser output controller 87a adjusts the pulse width of the driving pulse of such pixel based on the adjusting parameter stored in the pulse adjusting parameter 87c.

In the same manner, the binarizing circuit 85 is provided with the first binarized data analyzer 85g that analyzes the binarized data, and determines whether the driving pulse must be corrected. In the binarizing circuit 85, if the first binarized data analyzer 85g detects a pixel in which the pulse width of the driving pulse needs adjustment, the second adder-subtracter 85d adds to or subtracts from the error data utilizing the adding-subtracting parameter stored in the adding-subtracting parameter 85e. Here, the adding-subtracting parameter stored in the adding-subtracting parameter 85e corresponds to the adjusting parameter stored in the pulse adjusting parameter 87c of the record controlling circuit 87. The correction amount of the binarizing process of the binarizing circuit 85 corresponds to the adjustment amount of the driving pulse of the record controlling circuit 87.

As described above, the copy process circuit 80 is provided with the binarized data analyzers 85g and 87b in the binarizing circuit 85 and the record controlling circuit 87 respectively. There is therefore no need to exchange the analyzed results of the binarized data between the binarizing circuit 85 and the record controlling circuit 87. The amount of data exchanged between the binarizing circuit 85 and the record controlling circuit 87 can thus be reduced, and there is no need for a memory for storing the analyzed results. Further, the wiring configuration of signal lines can be simplified.

A case will now be imagined in which the binarizing circuit 85 is not provided with the binarized data analyzer 85g and the adding-subtracting parameter 85e. In this case, the process of the binarizing circuit 85 will be as follows. FIG. 14 shows changes in the data when, in this case, pixel values describing 25% tone are input continually. In order to simplify this description, a case is described in which the accumulated error value is distributed only in a following pixel. However, the accumulated error value can also be distributed in the surrounding pixels.

As shown in FIG. 14, when the process begins, the accumulated error value stored in the error memory 85*f* was '0'. Then, the accumulated pixel value becomes '25' that is equal to the input pixel value. If the threshold value is '50', the accumulated pixel value does not reach the threshold value, and consequently the binarized data becomes '0'. Since the binarized value is determined to be '0', the accumulated error value becomes '25' that is equal to the accumulated pixel value.

Then, when the next pixel value '25' is input, the accumulated error value '25' is added to the pixel value '25', and the accumulated pixel value becomes '50'. Since the accumulated pixel value has reached the threshold value, the binarized data is determined to be '1'. When the binarized data is '1', the accumulated error value '100' is subtracted from the accumulated pixel value '50', and the value becomes '−50'. Below, by repeating the same calculations, the binarized data takes the values '0, 1, 0, 0, 0, 1, . . . ' i.e. the value '1' is taken after every three times the value '0' is taken. That is, pixels representing the formation of the printing dot appear with a frequency of one in four.

If this type of binarizing is performed, problems do not occur if the minimum dot size of the printer engine 4 is smaller than the resolution of the binarizing circuit 85. However, if the minimum dot size is greater, minute printing dot for the isolated pixel cannot be formed stably. The isolated pixel here means a pixel which has a different binarized data from adjoining pixels in the scanning direction differ from the binarized value. In this case, the pulse width of the driving pulse for the isolated pixel could be adjusted as described below.

Figure 7:
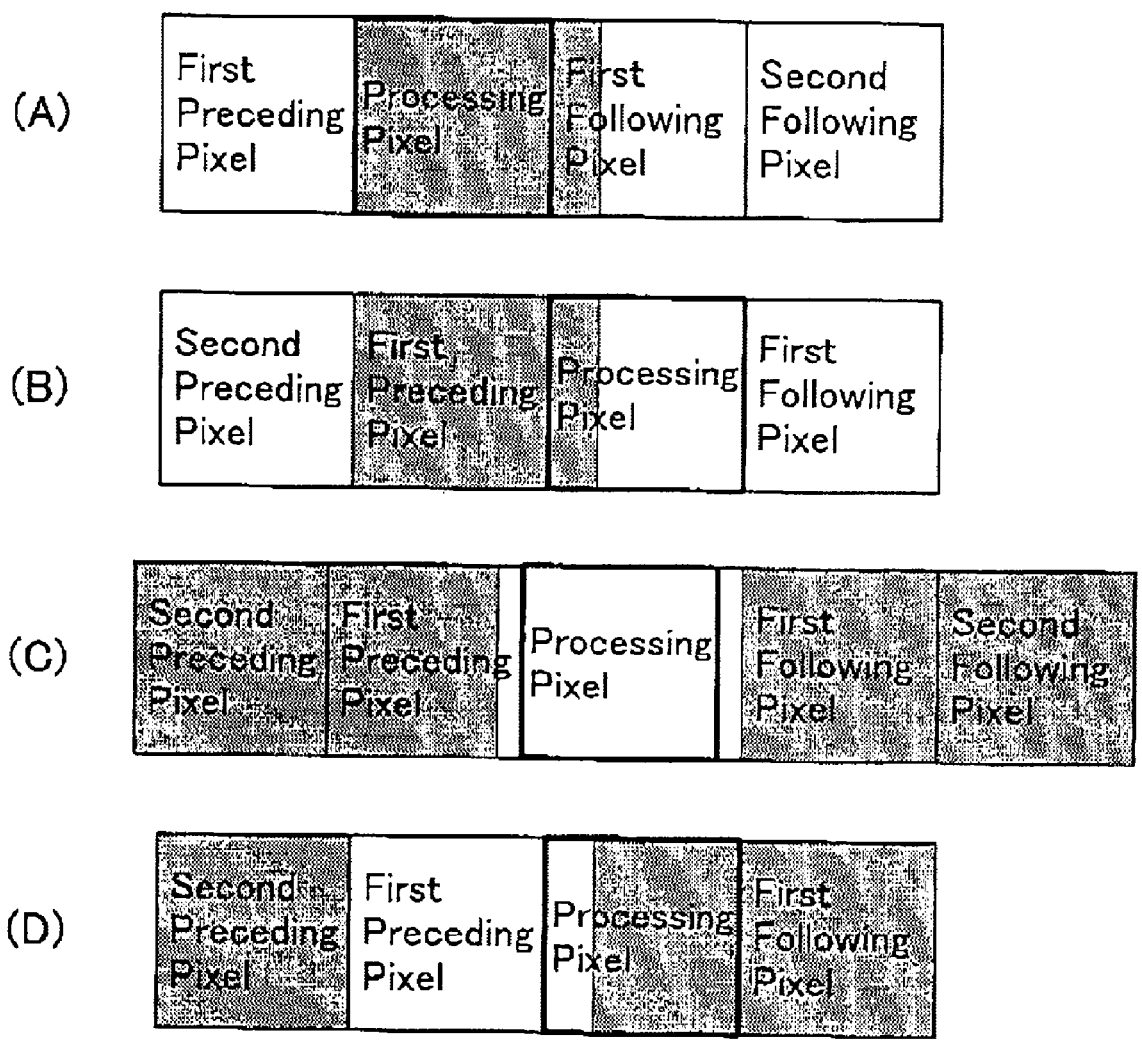
FIG. 7 is a figure describing a dilating process and a contracting process.

For example, as shown in FIG. 7 (A), in the case where a processing pixel is a black isolated pixel, a process can be considered for elongating the pulse width of the driving pulse of that black isolated pixel into a part of a region of a following pixel. Further, as shown in FIG. 7 (B), in the case where the preceding pixel of the processing pixel is a black isolated pixel, a process can be considered for elongating the driving pulse of the preceding pixel into a part of a region of the processing pixel. This type of adjustment process for elongating the pulse width of the driving pulse for the pixel is termed a dilating process.

Conversely, as shown for example in FIG. 7 (C), in the case where the processing pixel is a white isolated pixel, a process can be considered for contracting the pulse width of the driving pulse of the pixels before and after the processing pixel. Further, as shown in FIG. 7 (D), in the case where the preceding pixel of the processing pixel is a white isolated pixel, a process can be considered for contracting the pulse width of the driving pulse of the processing pixel. This type of adjustment process for contracting the pulse width of the driving pulse for the pixel is termed a contracting process.

By performing these types of processes it is possible to cause the toner T for forming the printing dots to be stable and not spread on the recording paper P, and it is thus possible to prevent non-printing dots from being destroyed.

Figure 8:
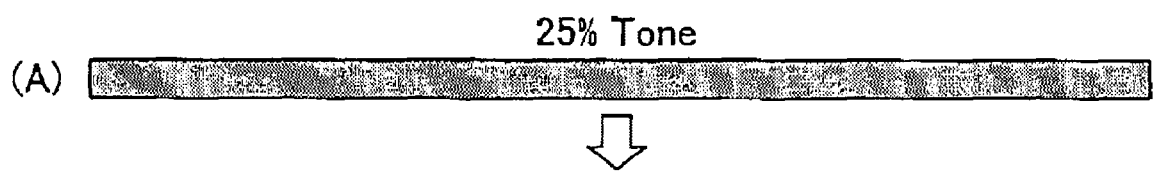
FIG. 8 is a figure describing results of the binarizing circuit in the dilating process.
Figure 8:
Figure 8:
Figure 8:
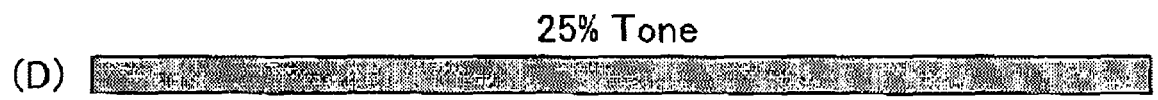
Figure 8:
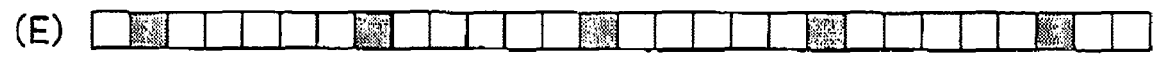
Figure 8:

However, if simply the above processes are performed, the following types of problem occur. As shown in FIG. 8 (A), if for example image data with a tone of 25% is binarized, binarized data is obtained as shown in FIG. 8 (B) in which the value '1' appears with a frequency of one in four. If a dilating process of 50% is performed on this binarized data, an overall tone of 37.5% is obtained, as shown in FIG. 8 (C), and the image becomes darker overall. To deal with this, the binarizing circuit 85 is provided with the first binarized data analyzer 85*g* and the adding-subtracting parameter 85*e* in the present embodiment, thus solving this problem.

Figure 9:
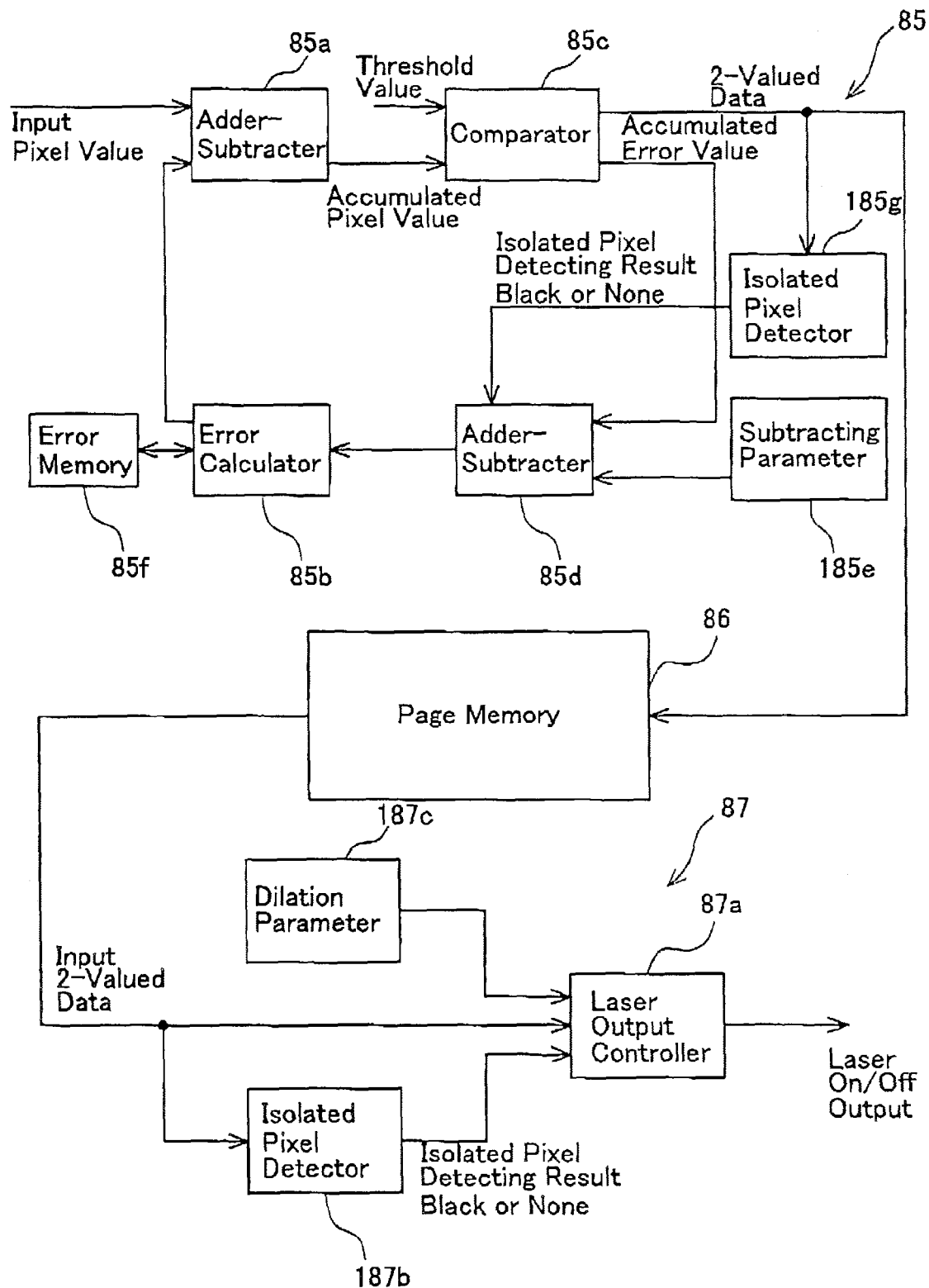
FIG. 9 is a block diagram showing in detail the configuration of the binarizing circuit and the record controlling circuit when only black isolated pixel is taken into consideration.

First, a case will be described in which only the black isolated pixels are taken into consideration. In the case where only the black isolated pixels are considered, the configuration of the binarizing circuit 85 and the record controlling circuit 87 shown in FIG. 6 can be rewritten to be as shown in FIG. 9. Isolated pixel detectors 185*g* and 187*b* shown in FIG. 9 correspond to the binarized data analyzers 85*g* and 87*b* shown in FIG. 6. Based on the binarized data, in which the image data has been binarized, the isolated pixel detectors 185*g* and 187*b* detect the black isolated pixels as pixels in which the driving pulse requires adjustment. A dilation parameter 187*c* shown in FIG. 9 corresponds to the pulse adjusting parameter 87*c* shown in FIG. 6. The dilation parameter 187*c* stores a dilation parameter for regulating the amount by which the pulse width is widened during a dilation process. When the isolated pixel detector 187*b* has detected a black isolated pixel, the laser output controller 87*a* dilates the width of the driving pulse of the black isolated pixel based on the dilation parameter. A subtracting parameter 185*e* shown in FIG. 9 corresponds to the adding-subtracting parameter 85*e* shown in FIG. 6. The subtracting parameter 185*e* stores a subtracting parameter for regulating the amount of subtraction of the error data, when the isolated pixel detector 185*g* has detected the black isolated pixel.

Figure 10:
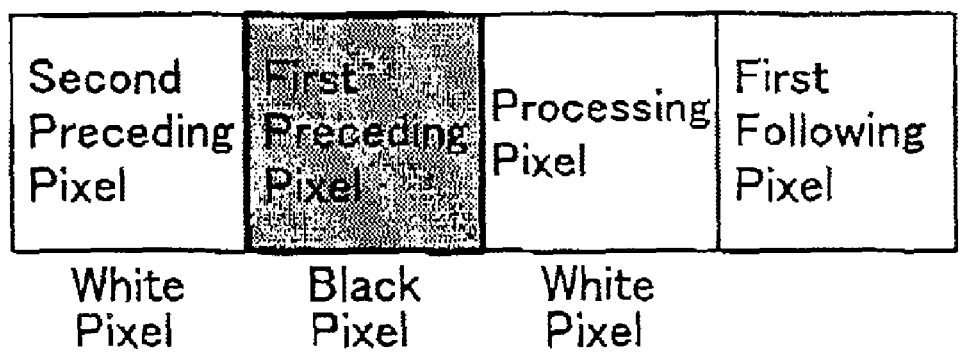
FIG. 10 is a figure describing a process of identifying black isolated pixel and white isolated pixel.
Figure 10:
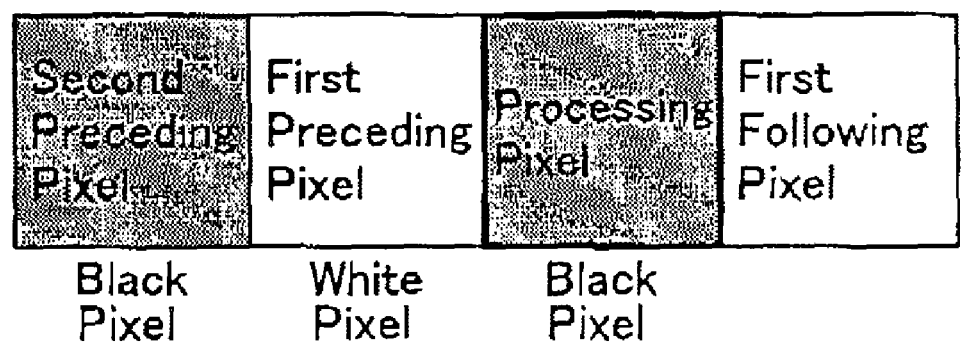

When the processing pixel is 'white' (the binarized value is '0'), the first preceding pixel is 'black' (the binarized value is '1'), and the second preceding pixel is 'white', as shown in FIG. 10 (A), the isolated pixel detectors 185*g* and 187*b* determine that the first preceding pixel is a black isolated pixel. Further, when the processing pixel is 'black', the first preceding pixel is 'white', and the second preceding pixel is 'black', as shown in FIG. 10 (B), the isolated pixel detectors 185*g* and 187*b* determine that the first preceding pixel is a white isolated pixel.

The effects of the present embodiment having this type of configuration will be described below. Further, the subtracting parameter and the dilation parameter will both be '50'. FIG. 15 shows how the accumulated pixel value and the accumulated error value change when pixel values describing 25% tone are input continually.

As shown in FIG. 15, when the process begins, the accumulated error value stored in the error memory 85*f* is '0'. As a result, the accumulated pixel value becomes '25' that is equal to the input pixel value. If the threshold value is '50', the accumulated pixel value does not reach the threshold value, and consequently the binarized data becomes '0'. Since the binarized data is determined to be '0', the accumulated error value becomes '25' that is equal to the accumulated pixel value.

Then, when the pixel value '25' is input, the present accumulated error value '25' is added to the pixel value '25', and the new accumulated pixel value becomes '50'. Since the renewed accumulated pixel value '50' has reached the threshold value, the binarized data becomes '1'. Since the binarized data is determined to be '1', '100' is subtracted from the accumulated pixel value '50', and the new accumulated error value becomes '−50'.

Furthermore, when the pixel value '25' is input, the accumulated pixel value becomes '−25'. Since the accumulated pixel value does not reach the threshold value, the binarized data becomes '0'. Since the binarized data is '0', '25' is added to the accumulated error value. The new accumulated error value prior to subtracting the subtracting parameter becomes '−25'. The subtracting parameter will be explained below. In this case, it is detected that the preceding pixel is a black isolated pixel. Thereupon, the subtracting parameter '50' is subtracted from the accumulated error value '−25', giving '−75'.

Then, each time the pixel value '25' is input, an accumulated error value '25' is added. When the accumulated error value becomes '25', a further pixel value '25' is input, and the accumulated pixel value becomes '50', the binarized data is determined to be '1'. Below, by repeating the same type of calculations, the binarized data takes a value of '1' after every five times the value '0' is taken.

In the present embodiment, binarized data is obtained as shown in FIG. 8 (E) in which the value '1' appears after every five times the value '0' is taken (i.e. with a frequency of one in six) for image data with a tone of 25% as shown in FIG. 8 (D). When a dilating process, wherein the driving pulse has a dilation parameter of 50%, is performed on this binarized data, an image as shown in FIG. 8 (F) is formed wherein the overall tone is 25%.

In this manner, an image can be formed stably in the present embodiment, and the image can be prevented from becoming darker or lighter overall. Satisfactory gradation expressions can thus be formed.

Figure 11:
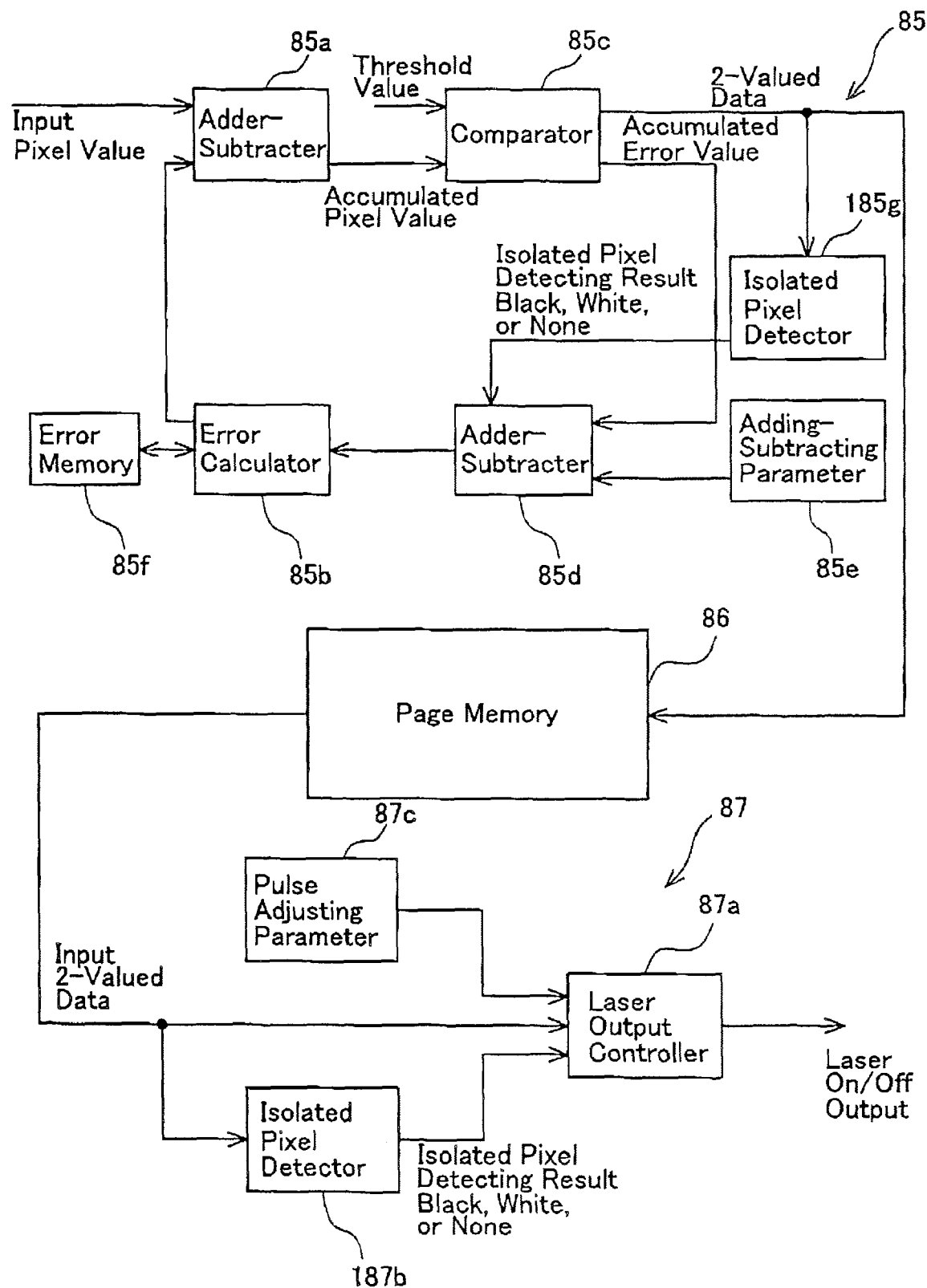
FIG. 11 is a block diagram showing the configuration of the binarizing circuit and the record controlling circuit when both black isolated pixel and white isolated pixel are taken into consideration.

Furthermore, in the case where both black isolated pixels and white isolated pixels are taken into consideration, the binarizing circuit 85 (see FIG. 11) and the record controlling circuit 87 can have a similar configuration. In this case, as shown in FIG. 11, the isolated pixel detectors 185*g* and 187*b* detect both the black isolated pixels and the white isolated pixels. Further, the adding-subtracting parameter 85*e* stores a subtracting parameter that is used when a black isolated pixel has been detected, and stores an adding parameter that is used when a white isolated pixel has been detected. Moreover, the pulse adjusting parameter 87*c* stores a dilation parameter that is used when a black isolated pixel has been detected, and stores a contraction parameter that is used when a white isolated pixel has been detected.

Further, the binarized data analyzers 85*g* and 87*b* shown in FIG. 6 are not restricted to black isolated pixels and white isolated pixels, but can also detect pixels that fulfill other conditions as pixels that need pulse width adjustment.

Above, the configuration of the present embodiment was described using as an example the process for black. However, the above configuration can also be formed for each of the colors C (cyan), M (magenta), Y (yellow), and K (black). Alternatively, the data of these colors can be processed sequentially by the set of the binarizing circuit 85 and the record controlling circuit 87.

Figure 12:
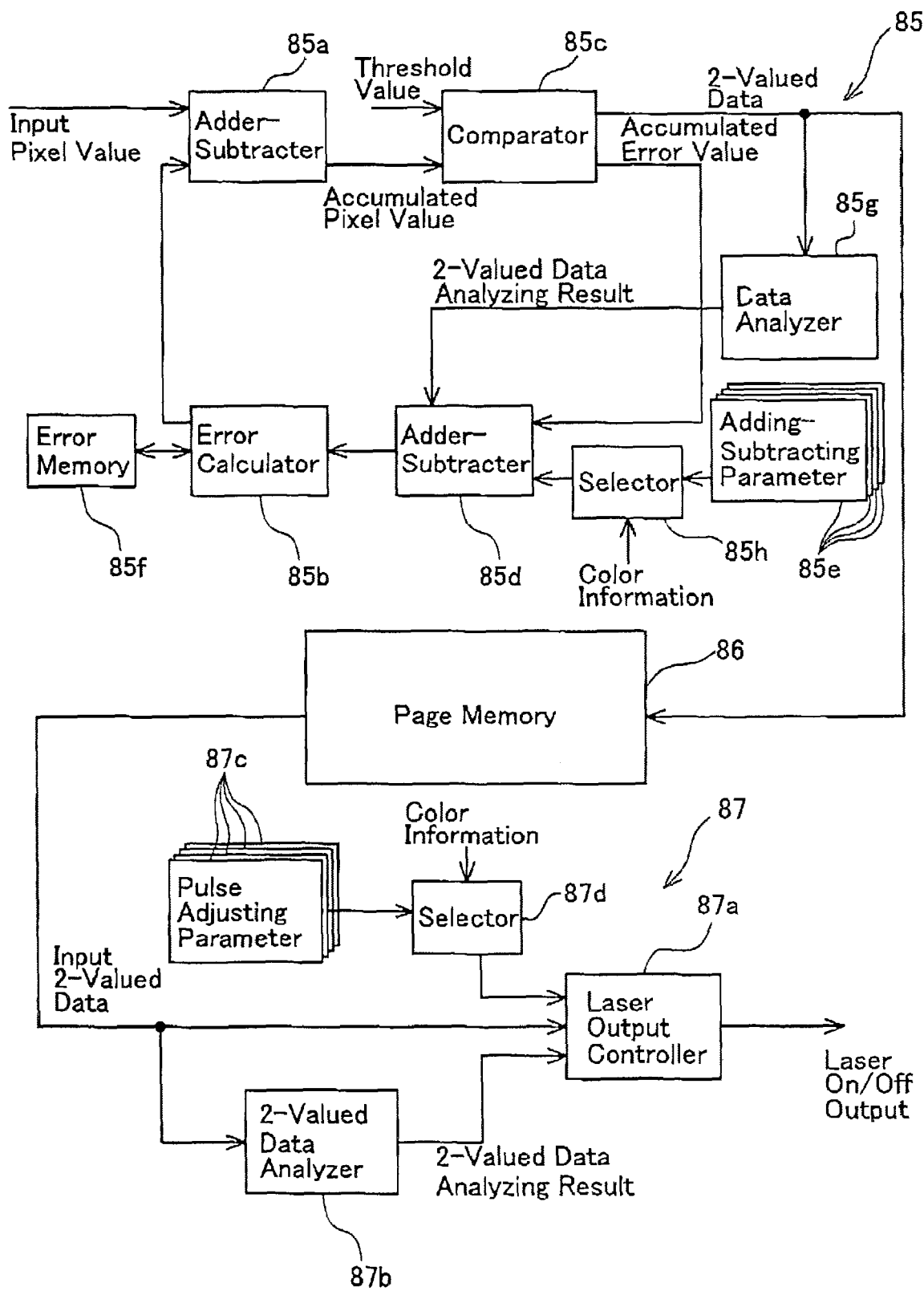
FIG. 12 a block diagram showing the configuration of the binarizing circuit and the record controlling circuit relating to all colors.
Figure 13:
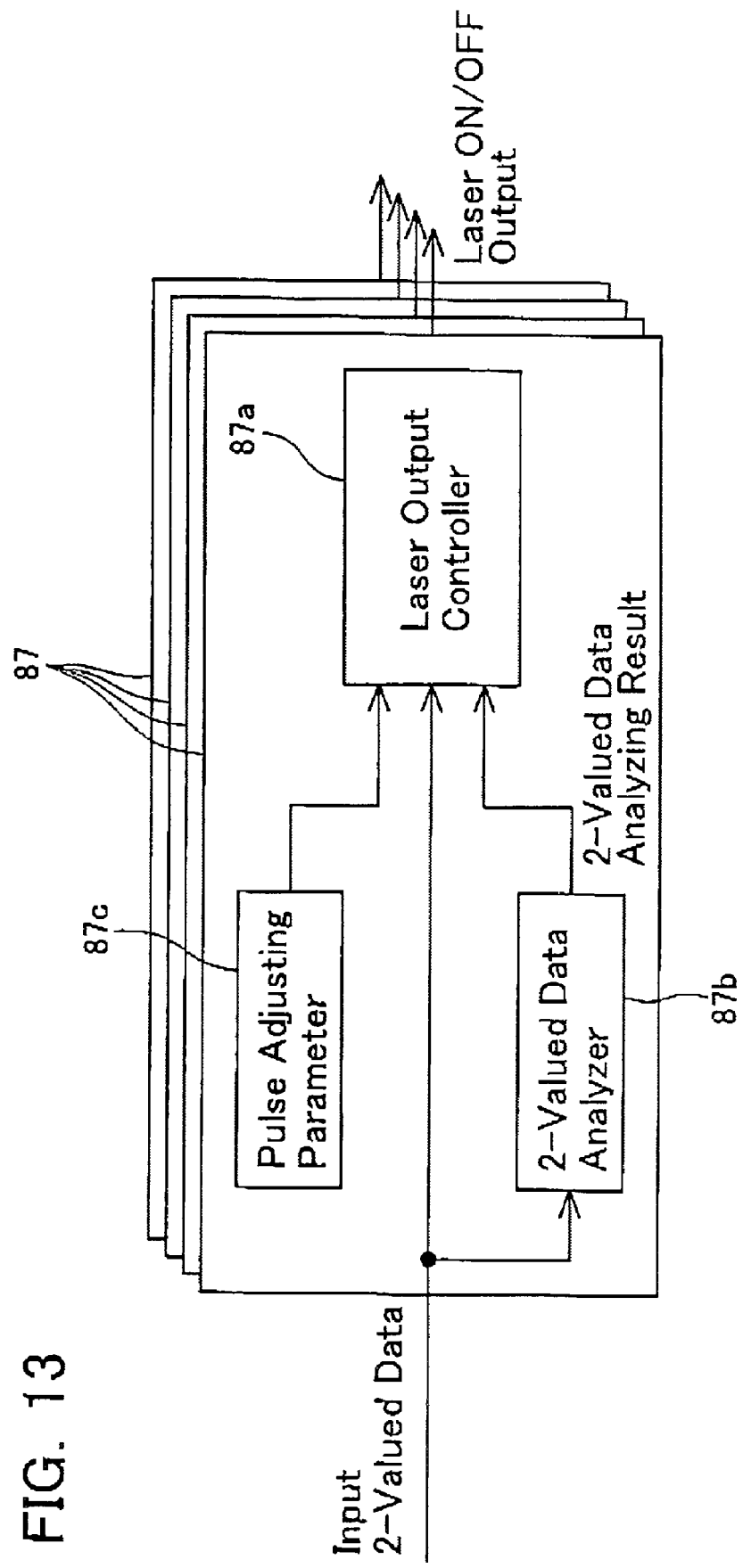
FIG. 13 a block diagram showing details of a variant configuration of the record controlling circuit relating to all colors.

The minimum dot size of the printer engine 4 can also be affected by differences in electrostatic amount caused for example by differences in composition of the toner T. As a result, the minimum dot size of the printer engine 4 varies according to color. If the minimum dot size differs, the most suitable value of the adjusting parameter of the aforementioned dilation parameter, contraction parameter, etc. will also differ. To deal with this, the adding-subtracting parameter 85*e* and the pulse adjusting parameter 87*c* are provided for each color, forming four sets as shown in FIG. 12 and, based on the color of the image data to be processed, the parameters input to the adder-subtracter 85*d* and the laser output controller 87*a* may be switched by selectors 85*h* and 87*d*. In this case, the image data of each color can be formed stably, and it is possible to prevent the overall image from becoming darker or lighter. As a result, it is possible to satisfactorily form images with desired color matching. Alternatively, instead of providing the selector 87*d*, record controlling circuits 87 may be provided for each color, forming four sets as shown in FIG. 13. In this case, also, the same effects occur. The configuration shown in FIG. 13 is suitable for the case where the printer engine 4 adapts a tandem method. The configuration shown in FIG. 12 is suitable for the case where the printer engine 4 adapts a four cycle method.

Specific examples of an embodiment of the present invention are presented above, but these merely illustrate some possibilities of the invention and do not restrict the claims thereof. The art set forth in the claims includes transformations and modifications to the specific examples set forth above.

For example, data from a digital camera or the like may be read directly to the memory 83, and the aforementioned processes may be performed on the data.

Further, in the case where the minimum dot size of the printer engine 4 is double or greater than the resolution of the image data after binarization, a process for reducing the resolution of the image process may also be utilized.

Moreover, the image processing apparatus realized by the present invention does not necessarily need a structure for forming driving pulses of the printer engine. For example, the embodiment described above may be a scanner apparatus provided only with the configuration from the image sensor 5 to the binarizing circuit 85 (see FIG. 4).

Furthermore, the technical elements disclosed in the present specification or figures may be utilized separately or in all types of conjunctions and are not limited to the conjunctions set forth in the claims at the time of submission of the application. Furthermore, the art disclosed in the present specification or figures may be utilized to simultaneously realize a plurality of aims or to realize one of these aims.

What is claimed is:

1. An apparatus for processing data describing an image, the apparatus comprising:
    an input device that inputs the data including a sequence of pixel values, each pixel value describing tone of a corresponding one of pixels arranged in a scanning direction;
    a binarizing device that performs a binarizing calculation for each pixel based on the input data, wherein the binarizing device comprises:
    a flag determining device configured to accumulate the pixel values up to a processing pixel, to assign a printing-flag for the processing pixel when the accumulated value reaches a first predetermined value, to subtract a second predetermined value from the accumulated value when the accumulated value reaches the first predetermined value, and to assign a nonprinting-flag for the processing pixel when the accumulated value does not reach the first predetermined value, and
    a repeating device configured to repeatedly activate the flag determining device by advancing the processing pixel along the scanning direction,
    a correcting device that corrects the accumulated value in order to reduce occurrence of the printing-flag when the nonprinting-flag is assigned to a second preceding pixel, the printing-flag is assigned to a first preceding pixel and the nonprinting-flag is assigned to the processing pixel, wherein the second preceding pixel is adjacent to the first preceding pixel and the first preceding pixel is adjacent to the processing pixel;
    a driving pulse generating device that generates driving pulses based on the flags assigned to the pixels; and
    an adjusting device that elongates the driving pulse for the first preceding pixel in order to make a printing dot longer when the nonprinting-flag is assigned to the second preceding pixel, the printing-flag is assigned to the first preceding pixel and the nonprinting-flag is assigned to the processing pixel;

wherein an amount of correction of the accumulated value and a magnitude of elongation of the driving pulse are determined so that the reduced printing-flag occurrence cancels and effect of the elongation of the printed dot on the tone of images.

2. An apparatus as in claim 1, wherein
the input data includes at least two sets of data for different colors; and
the amount of correction of the accumulated value and the magnitude of elongation of the driving pulse vary for each color.

3. An image forming device, comprising:
the apparatus as in claim 1;
a photosensitive member on which an electrostatic latent image is formed by exposure;
an exposing device exposing the photosensitive member based upon driving pulses generated by the driving device of the image processing device;
a developing device using developer to develop the electrostatic latent image formed on the photosensitive member; and
a transferring device transferring the developer adhered to the photosensitive member to a recording medium.

4. An apparatus for processing data describing an image, the apparatus comprising:
an input device that inputs the data including a sequence of pixel values, each pixel value describing tone of a corresponding one of pixels arranged in a scanning direction;
a binarizing device that performs a binarizing calculation for each pixel based on the input data, wherein the binarizing device comprises:
a flag determining device configured to accumulate the pixel values up to a processing pixel, to assign a printing-flag for the processing pixel when the accumulated value reaches a first predetermined value, to subtract a second predetermined value from the accumulated value when the accumulated value reaches the first predetermined value, and to assign a nonprinting-flag for the processing pixel when the accumulated value does not reach the first predetermined value, and
a repeating device configured to repeatedly activate the flag determining device by advancing the processing pixel along the scanning direction,
a correcting device that corrects the accumulated value in order to increase occurrence of the printing-flag when the printing-flag is assigned to a second preceding pixel, the nonprinting-flag is assigned to a first preceding pixel and the printing-flag is assigned to the processing pixel, wherein the second preceding pixel is adjacent to the first preceding pixel and the first preceding is adjacent to the processing pixel;
a driving pulse generating device that generates driving pulses based on the flags assigned to the pixels; and
an adjusting device that shortens the driving pulse for the second preceding pixel and/or the driving pulse for the processing pixel in order to make a printing dot shorter when the printing-flag is assigned to the second preceding pixel, the nonprinting-flag is assigned to the first preceding pixel and the printing-flag is assigned to the processing pixel;
wherein an amount of correction of the accumulated value and a magnitude of shortening of the driving pulse are determined so that the reduced printing-flag occurrence cancels and effect of the shortening of the printed dot on the tone of images.

5. An apparatus as in claim 4, wherein
the input data includes at least two sets of data for different colors; and
the amount of correction of the accumulated value and the magnitude of the shortening of the driving pulse vary for each color.

6. An image forming device, comprising:
an apparatus according to claim 5;
a photosensitive member on which an electrostatic latent image is formed by exposure;
an exposing device exposing the photosensitive member based upon driving pulses generated by the driving device of the image processing device;
a developing device using developer to develop the electrostatic latent image formed on the photosensitive member; and
a transferring device transferring the developer adhered to the photosensitive member to a recording medium.

7. An apparatus for processing data describing an image, the apparatus comprising:
an input device that inputs the data including a sequence of pixel values, each pixel value describing tone of a corresponding one of pixels arranged in a scanning direction;
a binarizing device that performs a binarizing calculation for each pixel based on the input data, wherein the binarizing device comprises:
a flag determining device configured to accumulate the pixel values up to a processing pixel, to assign a printing-flag for the processing pixel when the accumulated value reaches a first predetermined value, to subtract a second predetermined value from the accumulated value when the accumulated value reaches the first predetermined value, and to assign a nonprinting-flag for the processing pixel when the accumulated value does not reach the first predetermined value, and
a repeating device configured to repeatedly activate the flag determining device by advancing the processing pixel along the scanning direction,
a correcting device that corrects the accumulated value in order to reduce occurrence of the printing-flag when the nonprinting-flag is assigned to a second preceding pixel, the printing-flag is assigned to a first preceding pixel and the nonprinting-flag is assigned to the processing pixel, wherein the second preceding pixel is adjacent to the first preceding pixel and the first preceding is adjacent to the processing pixel.

8. An apparatus as in claim 7, wherein
the input data includes at least two sets of data for different colors; and
the amount of correction of the error value varies for each color.

9. An apparatus for processing data describing an image, the apparatus comprising:
an input device that inputs the data including a sequence of pixel values, each pixel value describing tone of a corresponding one of pixels arranged in a scanning direction;
a binarizing device that performs a binarizing calculation for each pixel based on the input data, wherein the binarizing device comprises:
a flag determining device configured to accumulate the pixel values up to a processing pixel, to assign a printing-flag for the processing pixel when the accumulated value reaches a first predetermined value, to subtract a second predetermined value from the accumulated value when the accumulated value reaches the first predetermined value, and to assign a nonprinting-flag for the processing pixel when the accumulated value does not reach the first predetermined value, and a repeating device configured to repeatedly activate the flag determining device by advancing the processing pixel along the scanning direction, a correcting device that corrects the accumulated value in order to increase occurrence of the printing-flag when the printing-flag is assigned to a second preceding pixel, the nonprinting-flag is assigned to a first preceding pixel and the printing-flag is assigned to the processing pixel, wherein the second preceding pixel is adjacent to the first preceding pixel and the first preceding is adjacent to the processing pixel.

10. An apparatus as in claim 9, wherein the input data includes at least two sets of data for different colors; and the amount of correction of the accumulated value varies for each color.

\* \* \* \* \*